(12) United States Patent
Damstra et al.

(10) Patent No.: US 7,528,876 B2
(45) Date of Patent: May 5, 2009

(54) IMAGE SENSING DEVICE, PROCESS FOR DRIVING SUCH A DEVICE AND ELECTRICAL SIGNAL GENERATED IN SUCH A DEVICE

(75) Inventors: Nicolaas Johannes Damstra, Breda (NL); Petrus Gijsbertus Maria Centen, Goirle (NL)

(73) Assignee: Thomson Licensing, Boulogne Billancourt (FR)

( * ) Notice: Subject to any disclaimer, the term of this patent is extended or adjusted under 35 U.S.C. 154(b) by 513 days.

(21) Appl. No.: 10/549,133

(22) PCT Filed: Mar. 6, 2004

(86) PCT No.: PCT/EP2004/002325

§ 371 (c)(1),
(2), (4) Date: Sep. 15, 2005

(87) PCT Pub. No.: WO2004/084543

PCT Pub. Date: Sep. 30, 2004

(65) Prior Publication Data

US 2006/0284995 A1     Dec. 21, 2006

(30) Foreign Application Priority Data

Mar. 18, 2003   (EP)   ................................. 03290690

(51) Int. Cl.
*H04N 3/14* (2006.01)
(52) U.S. Cl. ...................................... 348/308
(58) Field of Classification Search ............... None
See application file for complete search history.

(56) References Cited

U.S. PATENT DOCUMENTS 5,309,243 A    5/1994 Tsai
5,671,013 A    9/1997 Nakao (Continued)

FOREIGN PATENT DOCUMENTS

EP         0 387 817 A2    9/1990

(Continued)

OTHER PUBLICATIONS

Patent Abstracts of Japan, vol. 2000, No. 06, Sep. 22, 2000 & JP 2000-092396.

(Continued)

*Primary Examiner*—Justin P Misleh
(74) *Attorney, Agent, or Firm*—Robert D. Shedd; Robert B. Levy; Jorge Tony Villabon (57) ABSTRACT

An image sensing device has an image cell with a photo-sensitive element, a detection node and an output pin. Charges accumulated during a first period of time are transferred from the photo-sensitive element to the detection node, thereby obtaining a first voltage, and kept on the detection node which is thus used as a memory. Some moments later, a first value corresponding to the first voltage is generated on the output pin, charges accumulated during a second period of time are transferred from the photo-sensitive element to the detection node, thereby obtaining a second voltage, and a second value is generated on the output pin corresponding to the second voltage. The signal thus generated is also proposed.

10 Claims, 5 Drawing Sheets

U.S. PATENT DOCUMENTS

| | | | |
|---|---|---|---|
| 6,008,486 A * | 12/1999 | Stam et al. | 250/208.1 |
| 6,011,251 A | 1/2000 | Dierickx et al. | |
| 6,590,610 B2 * | 7/2003 | Castro et al. | 348/297 |
| 7,050,094 B2 * | 5/2006 | Krymski | 348/221.1 |
| 7,271,937 B2 | 9/2007 | Schrey et al. | |

FOREIGN PATENT DOCUMENTS

| | | |
|---|---|---|
| EP | 1 003 329 A1 | 5/2000 |
| EP | 1 233 613 A2 | 8/2002 |
| JP | 9-200617 | 7/1997 |
| JP | 2000-92396 | 3/2000 |
| JP | 2001-346096 | 12/2001 |
| WO | WO 02/052842 A2 | 7/2002 |

OTHER PUBLICATIONS

Patent Abstracts of Japan, vol. 1997, No. 11, Nov. 28, 1997 & JP 09-200617.

Search Report Dated May 28, 2004.

* cited by examiner

IMAGE SENSING DEVICE, PROCESS FOR DRIVING SUCH A DEVICE AND ELECTRICAL SIGNAL GENERATED IN SUCH A DEVICE

The invention relates to an image sensing device, to a process for driving such a device and to a signal generated in such a device.

In recent years, electronic imaging devices have been more and more widely used. In these devices, light-sensitive elements arranged as a matrix convert impinging light (photons) received during an integration time into a corresponding charge. The charge output by each element; is then used as an indicator of the light received by this element, and therefore as a measure of the light received from a given direction.

The sensitivity of the sensing device naturally depends on the integration time. To increase the dynamic range of the sensing device, it has already been proposed to use subsequently two different sensitivities (i.e. two different integration times) and to combine the two measurements into a single pixel value, as described for instance in WO 02/052 842.

Patent references EP 0 387 817, U.S. Pat. Nos. 5,309,243, 5,671,013 and JP 2001-346 096 describe solutions where each of the two pictures is stored in a memory external to the image sensor. The two pictures are then combined by appropriate processing into a picture with increased dynamic range.

To avoid storing complete images in external memories, patent application EP 1 003 329 proposes to combine the two measurements into an output value immediately after the measurements are made. However, this solution requires digital processing in the image sensor itself to combine the two measurements, which makes the image sensor more complex and thus more expensive.

Patent application EP 1 233 613 describes an alternative solution in which each pixel element is reset only when a predetermined charge has accumulated. When the charge has not reached the predetermined value, the reset is skipped. For each pixel, the number of reset skips is thus used as a further indicator of the incoming light in addition to the conventional charge peak value. However, this solution needs a complex architecture to select the pixels which have to be reset.

In view of these problems, the invention seeks a cost-effective and simple solution for a image sensing device with increased dynamic range.

The invention proposes a process for driving an image sensing device having an image cell with a photo-sensitive element, a detection node and an output pin, comprising the steps of:
transferring charges accumulated during a first period of time from the photo-sensitive element to the detection node, thereby obtaining a first voltage;
generating on the output pin a first value corresponding to the first voltage;
transferring charges accumulated during a second period of time from the photo-sensitive element to the detection node, thereby obtaining a second voltage
generating on the output pin a second value corresponding to the second voltage.

The two values are available at the level of the image cell without the need for a complex construction.

Preferably, the step of generating the first value is separated from the step of transferring charges accumulated during the first period by approximately the second period. It is then taken advantage of the detection node to store the first voltage during the second period, so that the two values can be output in a limited period of time.

In an advantageous embodiment, the step of generating the first value occurs more than 20 µs later (and preferably more than 1 ms later) than the step of transferring charges accumulated during the first period and the step of generating the second value occurs less than 20 µs later (and preferably less than 100 µs) than the step of generating the first value.

Said differently, when the image sensing device generates a video signal comprising lines separated by horizontal blanking intervals, the step of generating the first value occurs at least one line time minus a blanking interval time later than the step of transferring charges accumulated during the first period, whereas the step of generating the second value occurs less than the blanking interval time later than the step of generating the first value.

According to a preferred solution, when the image sensing device generates a video signal comprising horizontal blanking intervals, the step of generating the first value and generating the second value occur during a single horizontal blanking interval. This fully takes advantage of the detection node to store the first voltage while outputting the first and second value in the short horizontal blanking interval.

In a possible embodiment, the following steps are also realised in the image sensing device:
comparing the first value to a reference value
if the first value is above the reference value, generating an output value based on the first value;
if the first value is below the reference value, generating an output value based on the second value.

As an image sensing device generally has more than one image cell, the invention results in a process for driving an image sensing device having a first image cell with a first photo-sensitive element, a first detection node and a first output pin, and a second image cell with a second photo-sensitive element, a second detection node and a second output pin, the first output pin and the second output pin being connected to a common output wire, comprising the steps of:
transferring charges accumulated during a first time-length from the first photo-sensitive element to the first detection node, thereby obtaining a first voltage;
transferring charges accumulated during the first time-length from the second photo-sensitive element to the second detection node, thereby obtaining a second voltage
generating on the first output pin a first value corresponding to the first voltage;
transferring charges accumulated during a second time-length from the first photo-sensitive element to the first detection node, thereby obtaining a third voltage;
generating on the first output pin a second value corresponding to the third voltage;
generating on the second output pin a third value corresponding to the second voltage.

The values for a given image cell are grouped together thanks notably to the use of the detection nodes to store voltages.

Generally, this process further comprises the steps of:
transferring charges accumulated during the second time-length from the second photo-sensitive element to the second detection node, thereby obtaining a fourth voltage;
generating on the second output pin a fourth value corresponding to the fourth voltage.

The invention consequently proposes an electrical signal generated in an image sensing device having a first image cell and a second image cell, taking over increasing time:
a first value representing light received by the first image cell during a first time-length;

a second value representing light received by the first image cell during a second time-length;
a third value representing light received by the second image cell during the first time-length;
a fourth value representing light received by the second image cell during the second time-length.

The image sensing device has an image cell with a photo-sensitive element, a detection node and an output pin, and comprises transfer means for transferring charges from the photo-sensitive element to the detection node, read-out means for generating on the output pin a value based on the detection node voltage and driving means for controlling the transfer means and the read-out means so that at least two values are generated during an integration period.

In a possible embodiment, the image sensing device comprises comparator means for comparing at least one of said two values to a reference value.

It is to be noted that the steps and parts of signal are ordered as indicated but that they may be separated by other steps, such as steps to deal with the reset noise, as described below.

Other features of the invention will appear in the following description which refers to the appended drawings, where.

It should be noted that the various illustrations are not in scale in order to allow a clear presentation of the invention.

Figure 1A:
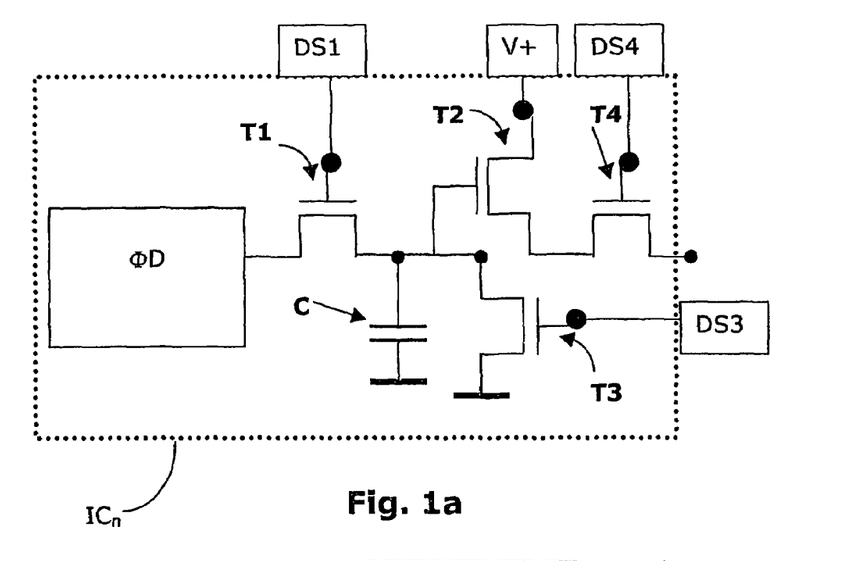
FIGS. 1a and 1b depict basic elements of a CMOS imager according to the invention.
Figure 1B:
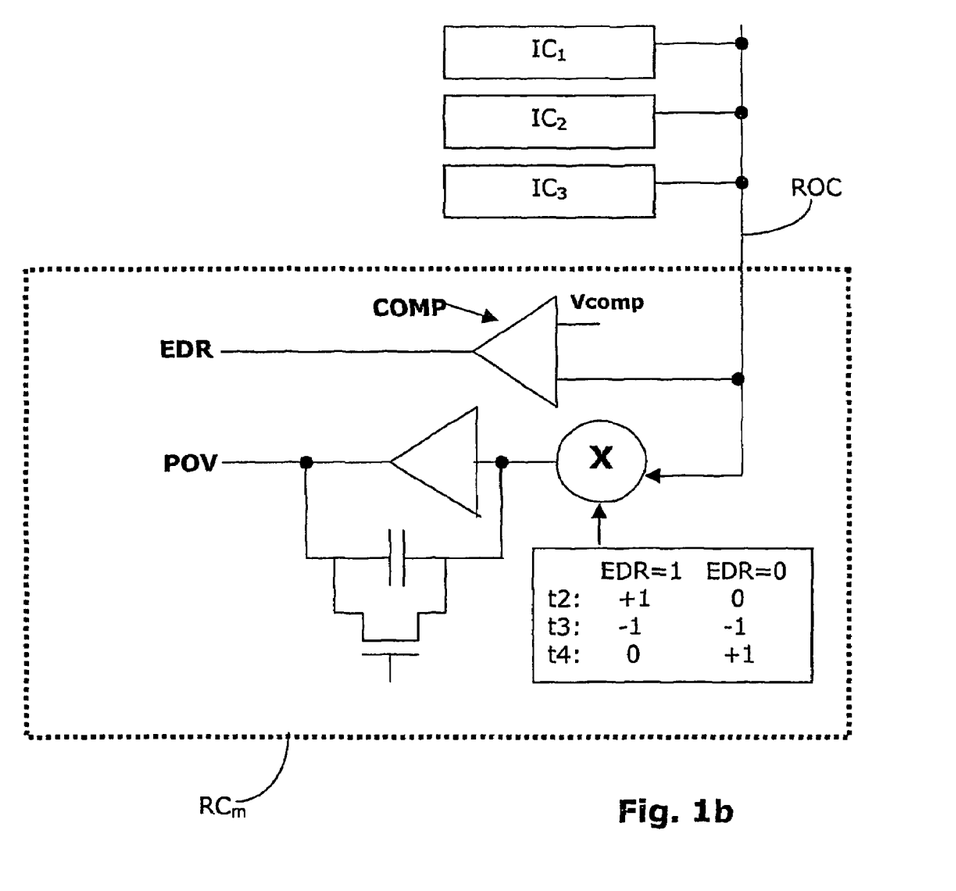

Some basic elements of a CMOS imager are represented on FIGS. 1a and 1b. An imager comprises a matrix of pixels or image cells.

FIG. 1a shows in detail an image cell $IC_n$. The image cell $IC_n$ comprises a photodiode which is the light-sensitive element of the image cell: the photodiode ΦD creates an amount of charges depending on the quantity of light it receives.

The photodiode ΦD is connected to a first plate of a capacitor C through a CMOS transistor T1 (transfer gate). The second plate of capacitor C is grounded. The first plate of capacitor C is also connected to ground via a CMOS transistor T3 (reset transistor) which can therefore reset (i.e. put to a reference value the voltage across) capacitor C.

Lastly, the first plate of capacitor C is connected to an output pin of the image cell $IC_n$ via CMOS transistors T2 (buffer transistor) and T4 (read-out or row address transistor), which allows to send out the value measured by the image cell $IC_n$. (For this description, row has the same meaning as line.)

The first plate of capacitor C thus realises a detection node.

Figure 2A:
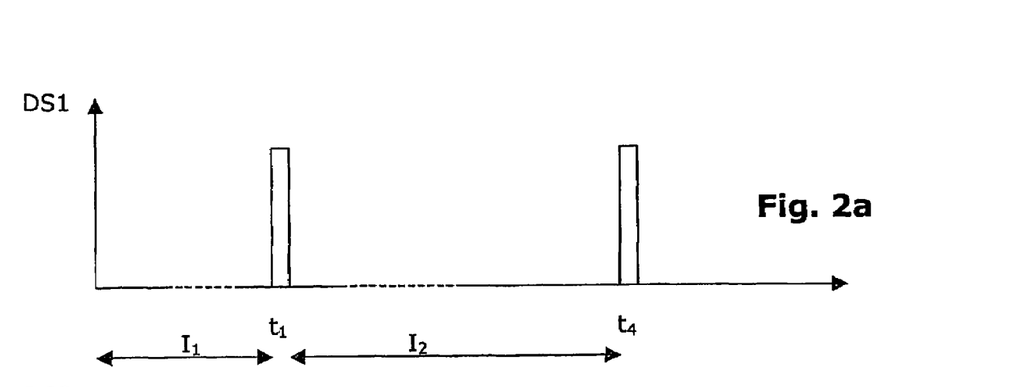
FIGS. 2a to 2c show the timing of the driving voltages of the transistors of an image cell according to the invention.
Figure 2B:
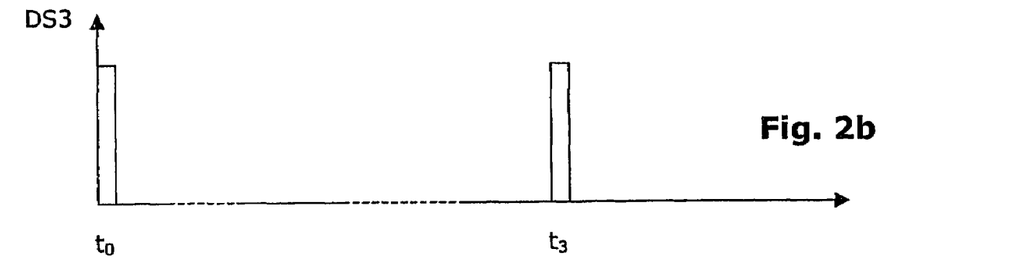
Figure 2C:
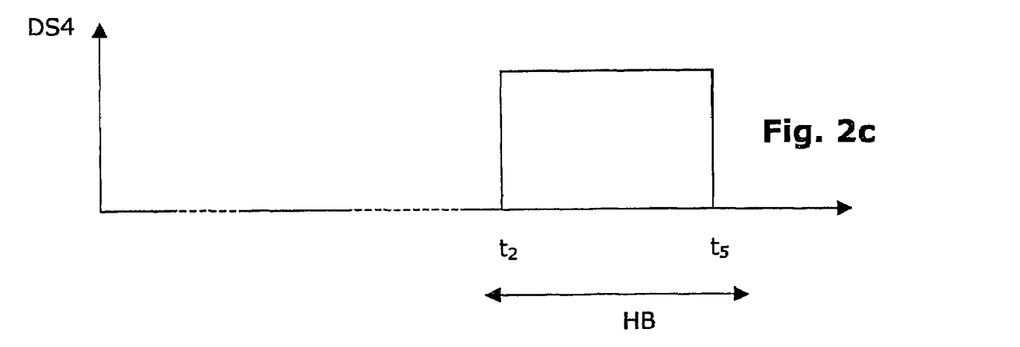

The transfer gate T1, the reset transistor T3 and the read-out transistor T4 are controlled by driving signals (respectively DS1, DS3 and DS4) as represented respectively on FIGS. 2a to 2c and further described later. Buffer transistor T2 is biased by a voltage V+ (which can be either a constant voltage or active only when it is needed).

FIG. 1b represents three image cells $IC_1$, $IC_2$ and $IC_3$ with their respective output connected to a read-out column ROC. Each image cell $IC_n$ of a column of the pixel matrix is similarly connected to a corresponding read-out column ROC. Each read-out column ROC transmits the measured values from the image cells of a column to a read-out circuit $RC_m$ dedicated to process the values of the column. Each column thus has a dedicated read-out circuit $RC_m$.

As represented on FIG. 1b, a read-out circuit RCm comprises a comparator COMP having a first input at a reference voltage $V_{comp}$ and a second input connected to the read-out column ROC. The result of the comparison is used as an extended dynamic range (EDR) signal as will be further described below.

The read-out column ROC carrying the various measured values, it is also connected to an output pin labelled POV (for Pixel Output Value) through a multiplier (by 0, +1 or −1 depending on the considered moment as further explained below) and an (integrating) amplifier.

The way of operation of the image sensing device according to the invention will now be explained in greater detail by the discussion of two exemplary cases.

FIGS. 3a to 3e illustrate how the image sensing device operates in a first possible case where the pixel typically receives a low to medium quantity of light.

Figure 3A:
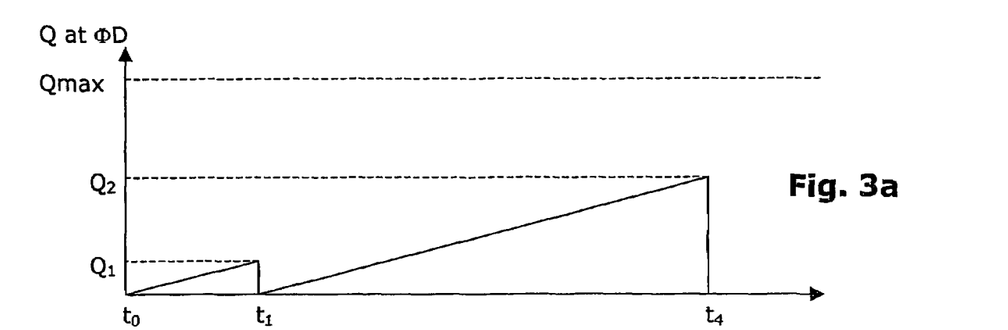
FIGS. 3a to 3e describe operation when a pixel receives a low to medium quantity of light.
Figure 3B:
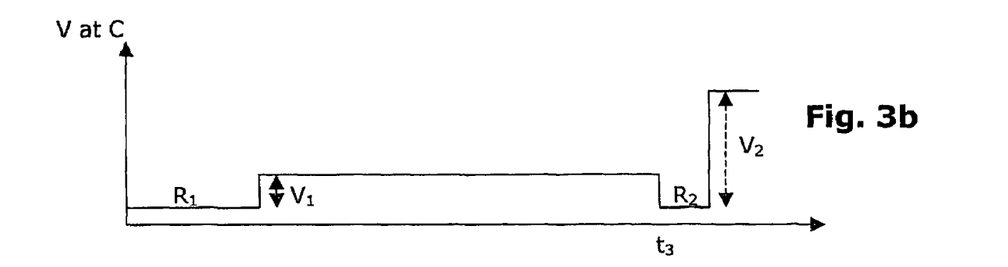

FIG. 3a represents the charges accumulated by the light sensitive element at a pixel over an integration period I. The integration period I is preferably in the range of several milliseconds; for instance, I=20 ms. Charges accumulate from a starting point $t_0$ of the integration period, during a first period $I_1$ ending at $t_1$, where $I_1=t_0-t_1=I/N$. Preferably, N is such that $I_1$ is an integer multiple of a line-time ($T_{line}$), for instance, $I_1=5\ T_{line}$. (For PAL, I=312.5 $T_{line}$, so that N=62.5.)

On the other hand, at $t_0$, the voltage at the detection node (illustrated on FIG. 3b) is reset by closing reset transistor T3 shortly (by driving signal DS3, see FIG. 2b) and the detection node thus carries a reset noise voltage $R_1$.

At $t_1$, the light sensitive element has accumulated an amount $Q_1$ of charges and the transfer gate T1 is shortly closed (by driving signal DS1, see FIG. 2a) in order to transfer the charges Q1 from the light sensitive element (photodiode ΦD) to the detection node (capacitor C), thereby rising the voltage at the detection node by a value $V_1$. The detection node has then the value $R_1+V_1$.

After t1, the light sensitive element accumulates charges again, over a second period $I_2$, preferably longer than $I_1$. According to a convenient solution, $I_2=I-I_1=I. (N-1)/N$.

Before the end of the second period, and preferably immediately before the end of the second period, at a moment $t_2$, read-out transistor T4 is closed (see FIG. 2c) to output the voltage at the detection node ($R_1+V_1$) to the read-out column ROC, where it is compared by the comparator to a reference value $V_{comp}$. The read-out values $V_{ROC}$ are represented on FIG. 3c.

Figure 3C:
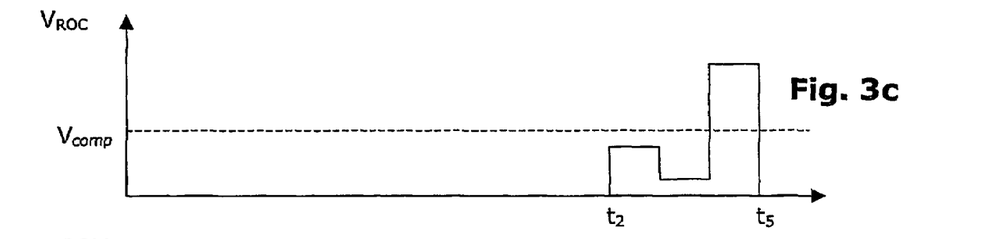

Preferably, the reference voltage is given by the formula:

$$V_{comp}=V_{max}/(N-1),$$

where $V_{max}$ is the clipping value corresponding to $Q_{max}$.

In the present example, the voltage from the detection node ($R_1+V_1$) is lower than the reference voltage $V_{comp}$, which means that assumption can be made that the pixel does not clip over the second (longer) period $I_2$. (The second example made with reference to FIGS. 4a to 4e describes operation when R1+V1>$V_{comp}$.)

The charges accumulated during the second period $I_2$ can thus be used as a basis for the value to be output for this pixel.

Figure 3D:
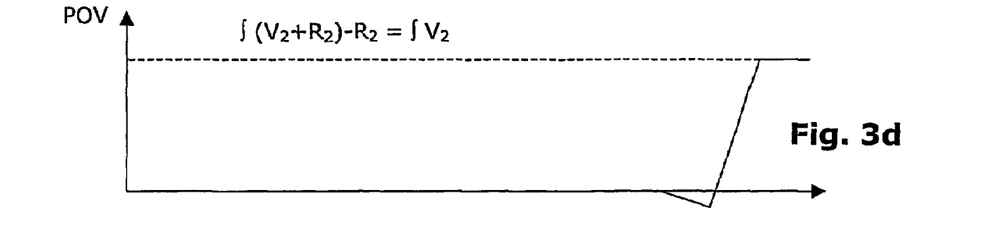
Figure 3E:
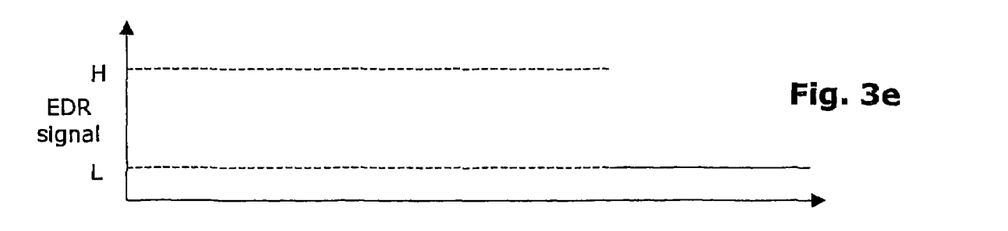

More precisely, immediately after the voltage ($R_1+V_1$) at the detection node has been transferred to the read-out column ROC, the voltage at the detection node is reset by shortly closing the reset transistor T3 (moment $t_3$, see FIG. 2b) and thus carries a reset noise voltage $R_2$, which is read-out immediately at the read-out column ROC and integrated at the column-amplifier with a negative sign (see FIG. 3d). Then, at moment $t_4$, the transfer gate T1 is closed (see FIG. 2a) in order to transfer the charges $Q_2$ accumulated by the light sensitive element during the second period to the detection node. The voltage at the detection node therefore increases by a value $V_2$ corresponding to charges $Q_2$. This ends the second period: $I_2=t_4-t_1$ and preferably the integration period: $I=t_4-t_0$. At this moment, the voltage at the detection node is $R_2+V_2$.

Preferably, the steps taken from $t_2$ to $t_4$ (and even from $t_2$ to $t_5$—see definition of $t_5$ below) occur during the horizontal blanking interval HB (immediately before the line comprising the image cell is output in the video signal). As these steps may create noise, this avoids that disturbances appear on active parts of the video signal. The duration $(t_4-t_2)$ is preferably within the range of several micro-seconds, for instance between 5 and 10 µs.

By reading out the detection node voltage $R_2+V_2$ and summing it up at the column-amplifier with a positive sign between $t_4$ and $t_5$, the amplifier has integrated a value representing the pixel output value POV: $-R_2+(R_2+V_2)=V_2$. The output value is thus the correct measured value, without the reset noise.

Besides, as the $(R_1+V_1)<V_{comp}$, the output of the comparator sends out a low Extended Dynamic Range signal (FIG. 3e) to indicate to further processing entities that the output value $V_2$ was measured during the period $I_2$.

Advantageously, N is large such that $I_2=I.(N-1)/N$ is close to I and the value $V_2$ can be roughly considered as taken over the whole integration period I. Anyway, the value $V_2$ can also be multiplied by $N/(N-1)$ to be precisely equal to the value it would have had if it had been integrated over the whole Integration period I.

FIGS. 4a to 4e illustrate how the image sensing device operates in a second possible case where the pixel typically receives a high quantity of light.

Figure 4A:
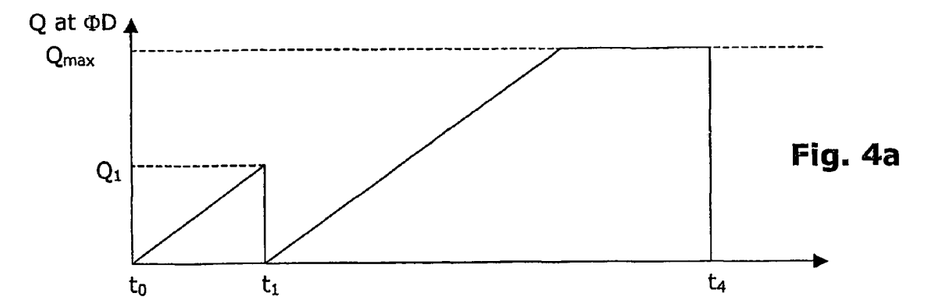
FIGS. 4a to 4e describe operation when a pixel receives a high quantity of light.
Figure 4B:
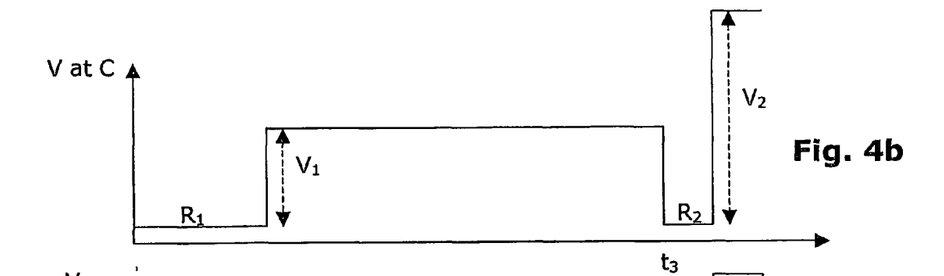
Figure 4C:
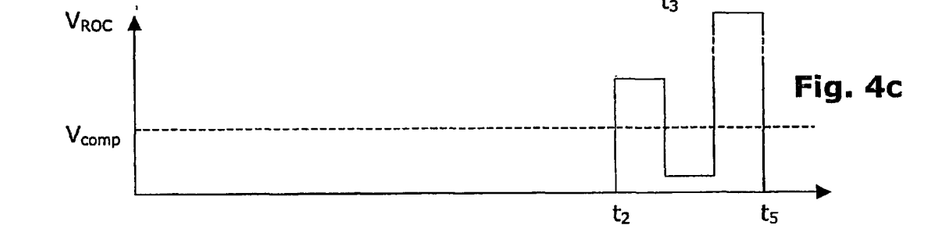

FIG. 4a represents the charges accumulated by the light sensitive element at the pixel over the integration period I. As previously, charges accumulate from the starting point to of the integration period, during the first period $I_1$ ending at $t_1$. As explained above, at $t_0$, the voltage at the detection node (illustrated on FIG. 4b) is reset by closing reset gate T3 and the detection node thus carries a reset noise voltage $R_1$.

At $t_1$, the light sensitive element has accumulated an amount $Q_1$ of charges and the transfer gate T1 is closed in order to transfer the charges Q1 from the light sensitive element (photodiode (ΦD)) to the detection node (capacitor C), thereby rising the voltage at the detection node by the value $V_1$. The detection node has then the value $R_1+V_1$.

After t1, the light sensitive element accumulates charges again, over the second period $I_2$, preferably longer than $I_1$. In this second example, the maximum amount of charges $Q_{max}$ acceptable by the light-sensitive element is reached before the end of the integration period (i.e. also before the end of the second period $I_2$): the pixel clips. This has the consequence that the amount of charges and the derived voltage will not accurately represent the amount of light received by the pixel over the second period $I_2$.

At moment $t_2$, read-out transistor T4 is closed to output the voltage at the detection node $(R_1+V_1)$ to the read-out column, where it is compared by the comparator to the reference value $V_{comp}$. The read-out values are represented on FIG. 4c.

In this second example, the voltage from the detection node $(R_1+V_1)$ is larger than the reference voltage $V_{comp}$. This is indicative that the pixel clips over the second period $I_2$ for the following reasons:

$R_1$ is small compared to $V_1$ (R1 is noise)

the amount of light being considered constant over the integration period (which is a basic assumption in such sensing devices), $$V_1 > V_{comp} = V_{max}/(N-1) \text{ over } I1$$

implies the voltage will reach $V_{max}$ before the end of $I_2=(N-1).I_1$.

Figure 4D:
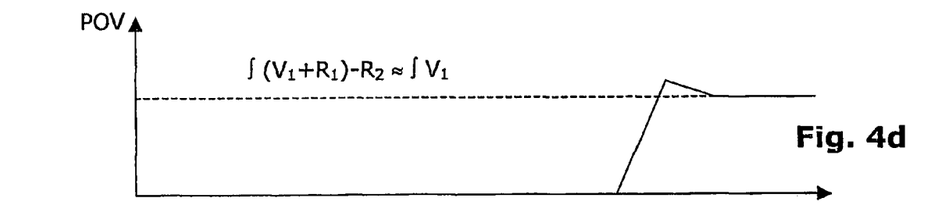
Figure 4E:
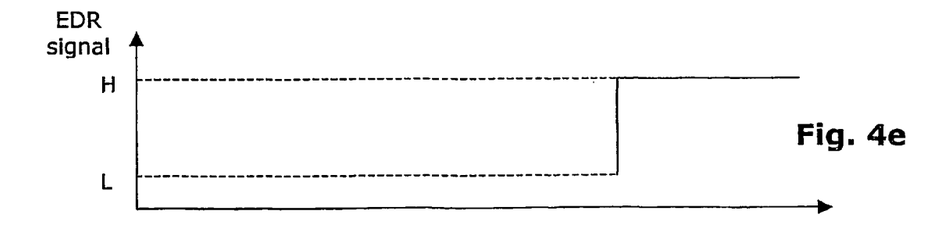

As the pixel clips when integrated over $I_2$, the value $(R_1+V_1)$ measured over the (shorter) first period $I_1$ is more representative of the quantity of light received by the light sensitive element and will be used to compute the pixel output value (POV) out of the column amplifier (FIG. 4d).

As $(R_1+V_1)>V_{comp}$, the output of the comparator sends out a high Extended Dynamic Range signal (see FIG. 4e) to indicate to further processing entities that the output value $V_1$ was measured during the period $I_1$. To retrieve the amount of light which has been received over integration time I, the pixel output value shall be multiplied by $N-1$ by further processing steps (or by N if the value is corrected by a factor $N/(N-1)$ when the Extended Dynamic Range is low—see above).

The voltage $(R_1+V_1)$ read-out at moment $t_2$, besides being used on the comparator input, is in this case integrated at the column-amplifier with a positive sign. Immediately afterwards, the voltage at the detection node is reset by shortly closing the reset transistor T3 (moment $t_3$) and thus carries a reset noise voltage R2, which is read-out immediately at the read-out column and integrated at the column-amplifier with a negative sign (see FIG. 4d).

The amplifier is then ready to send out the pixel output value:

$$POV = -R2 + (R1+V1) \approx V1.$$

The output value is thus a very close measure for the correct measured value as R2 and R2 are only noise values.

Finally, the clipped value $(R_2+V_2)$ is read-out to the read-out column ROC by closing read-out gates T2 and T4 but it is not integrated at the column amplifier because of the result of the comparison realised by the comparator: $(R_1+V_1)>V_{comp}$.

It is important to point out that in any case (case of FIGS. 3a to 3e and case of FIGS. 4a to 4e) the values for the other pixels (or image cells) of the column are read-out on the read-out column ROC between time $t_0$ and time $t_2$. During this period of time, the detection node (capacitor C) is used as a memory to store the first measurement $(R_1+V_1)$ made in the image cell. In this way, the first measurement $(R_1+V_1)$, the reset value $R_2$ and the second measurement $(R_2+V_2)$ for a given pixel can be transmitted successively on the read-out column, which greatly simplifies further processing of the signal.

These advantages can also be found in a possible alternative embodiment where the read-out circuit $RC_m$ does not select between the first and second measured values but transmits them both to a further processing stage together with the extended dynamic range (EDR) signal. In this embodiment, the output values thus correspond to the voltages carried by the read-out column ROC, as shown on FIG. 5.

Figure 5:
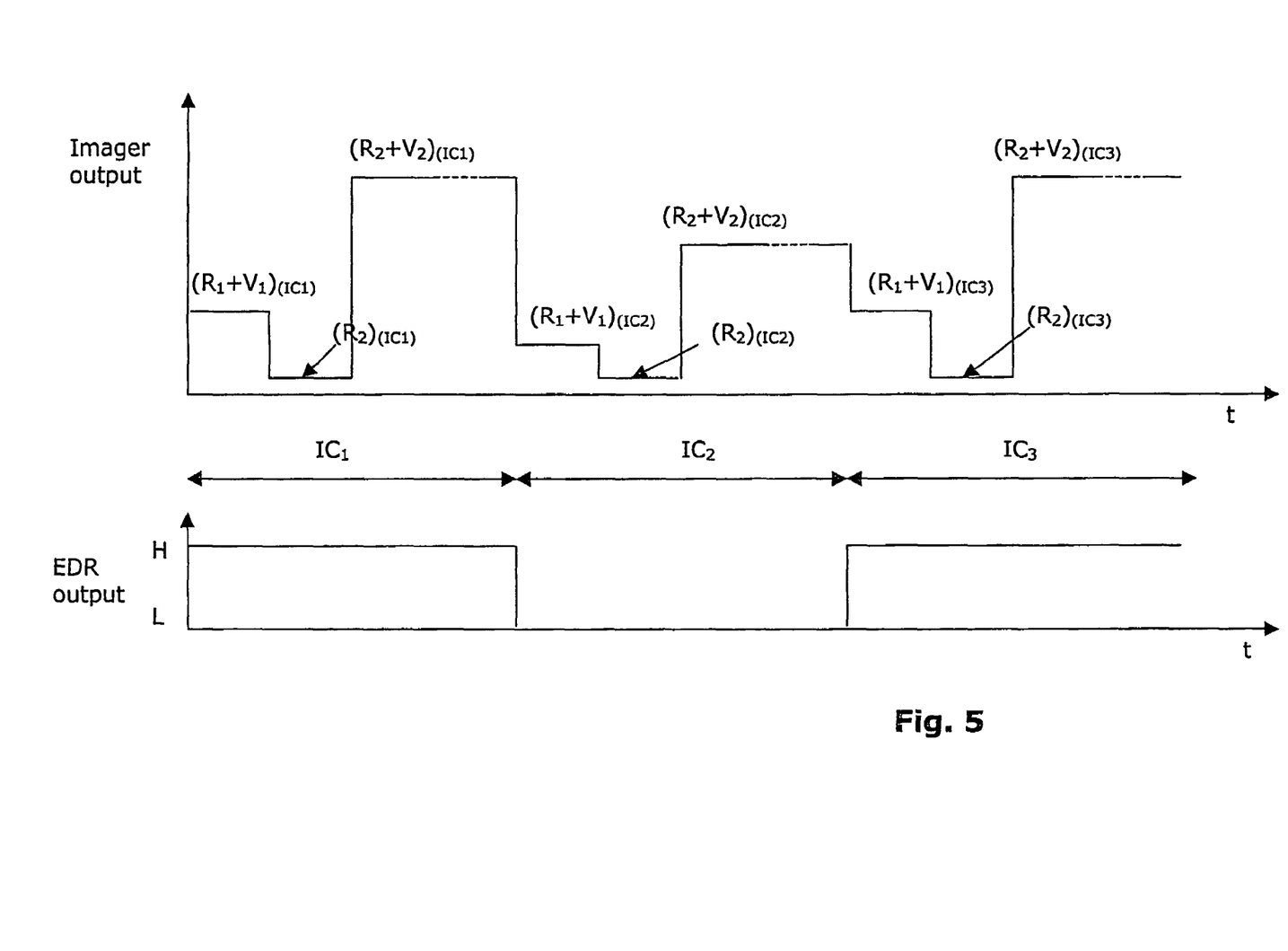
FIG. 5 illustrates a possible signal output from an imager according to a possible variation of the invention.

In the example of FIG. 5, image cells $IC_1$ and $IC_3$ clips over the second period $I_2$; correspondingly, the EDR signal is set to a high level H, indicating to further processing stages that the first measured value, respectively $(R_1+V_1)_{(IC1)}$ and $(R_1+V_1)_{(IC3)}$, should preferably be used. At the opposite, image cell $IC_2$ does not clip and the EDR signal is low (level L) for this image cell indicating that $(R_2+V_2)_{(IC2)}$ should preferably be used.

Of course, in this alternative embodiment, further processing stages take care for the selection between the two measured value and the possible correction thanks to the reset value $(R_2)_{(ICn)}$:

if EDR is high (H) for a pixel $IC_n$, the value to be used for this pixel is:

$(R_1+V_1)_{(ICn)}-(R_2)_{(ICn)}$, to be multiplied by (N−1) to be on the same scale as values integrated over the second period $I_2$;

if EDR is low (L) for a pixel $IC_n$, the value to be used for this pixel is:

$(R_2+V_2)_{(ICn)}-(R_2)_{(ICn)}$.

The invention is not limited to the examples given above. For instance, although the above examples use a CMOS imager, the invention also applies to other types of imagers, such as a CCD imager.

Similarly, although the invention has been explained with a light-sensitive element generating positive charges, it also applies to imagers with light-sensitive elements generating negative-charges.

The invention claimed is:

1. A method for driving an image sensing device having an image cell with a photo-sensitive element, a detection node and an output pin, wherein a reference signal and, via an output line, a value present at the output pin, are applied to a comparator, the method comprising the steps of:
    transferring charges accumulated during a first period of time from the photo-sensitive element to the detection node, thereby obtaining a first voltage;
    generating a first value corresponding to the first voltage;
    comparing the first value with the reference signal and determining a signal representing the result of the comparing;
    transferring charges accumulated during a second period of time from the photo-sensitive element to the detection node, thereby obtaining a second voltage;
    generating a second value corresponding to the second voltage; and
    selectively applying one of the first value or the second value to a single buffer, depending on a value of the signal resulting from the comparing;
    wherein the first and the second periods of time are subsequent to each other and are nested within a frame or field period, wherein the first period of time is shorter than the second period of time, and wherein the second period of time ends on or after reselling the detection node after reading out the first value.

2. The method according to claim 1, wherein the step of generating the first value is separated from the step of transferring charges accumulated during the first period by approximately the second period.

3. The method according to claim 1, wherein the step of generating the first value occurs more than 20 μs later than the step of transferring charges accumulated during the first period and wherein the step of generating the second value occurs less than 20 μs later than the step of generating the first value.

4. The method according to claim 3, wherein the step of generating the first value occurs more than 1 ms later than the step of transferring charges accumulated during the first period and wherein the step of generating the second value occurs less than 100 μs later than the step of generating the first value.

5. The method according to claim 1, wherein the image sensing device generates a video signal comprising lines separated by horizontal blanking intervals, wherein the step of generating the first value occurs at least one line time minus a blanking interval time later than the step of transferring charges accumulated during the first period and wherein the step of generating the second value occurs less than the blanking interval time later than the step of generating the first value.

6. The method according to claim 1, wherein the image sensing device generates a video signal comprising horizontal blanking intervals and wherein the steps of generating the first value and generating the second value occur during a single horizontal blanking interval.

7. The method according to claim 1, comprising the steps of:
    comparing the first value to a reference value prior to reading out the second value;
    if the first value is above the reference value, generating an output value based on the first value;
    if the first value is below the reference value, generating an output value based on the second value.

8. The method of claim 1, wherein the image sensing device has a first and a second image cell connected to a common output line, wherein the first signals of the first and the second image cell and the second signals of the first and the second image cell are applied to the common output line consecutively.

9. Image sensing device having an image cell with a photo-sensitive element, a detection node and an output pin, comprising:
    transfer means for transferring charges from the photo-sensitive element to the detection node;
    read-out means for generating on the output pin a value based on the detection node voltage;
    driving means for controlling the transfer means and the read-out means so that at least two values are generated during an integration period;
    a single buffer connected to the output pin; and
    comparator means for comparing at least one of said two values to a reference signal and for selectively applying the first value or the second value to the single buffer, depending on a value of the signal resulting from the comparing;
    wherein the buffer comprises an integrating amplifier and a means for changing a sign of a value applied to the integrating amplifier.

10. The method of claim 1, further including the steps of:
    resetting the detection node prior to transferring charges accumulated during the second period of time from the photo-sensitive element to the detection node; and
    applying the signal present in the detection node after resetting to the buffer, for subtraction.

* * * * *